United States Patent
Kim (10) Patent No.: US 7,356,646 B2
(45) Date of Patent: Apr. 8, 2008

(54) MEMORY CARD USING NAND FLASH MEMORY AND ITS OPERATING METHOD

(75) Inventor: Kyong-Ae Kim, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 372 days.

(21) Appl. No.: 11/025,731

(22) Filed: Dec. 28, 2004

(65) Prior Publication Data
US 2005/0207231 A1    Sep. 22, 2005

(30) Foreign Application Priority Data
Mar. 19, 2004   (KR) ............. 10-2004-0018967

(51) Int. Cl.
| G06F 9/26 | (2006.01) |
| G06F 9/34 | (2006.01) |
| G06F 12/06 | (2006.01) |
| G06F 12/00 | (2006.01) |
| G11C 11/34 | (2006.01) |
| G11C 16/04 | (2006.01) |
| H05K 7/10 | (2006.01) |

(52) U.S. Cl. ............. 711/115; 711/104; 711/202; 710/301; 365/185.33; 345/536

(58) Field of Classification Search ............. None
See application file for complete search history.

(56) References Cited

U.S. PATENT DOCUMENTS 6,643,725 B1* 11/2003 Kozakai et al. ............. 710/300
2002/0112119 A1* 8/2002 Halbert et al. ............. 711/115
2002/0133684 A1* 9/2002 Anderson ............. 711/200
2003/0177300 A1 9/2003 Lee et al.
2003/0188061 A1* 10/2003 Luse et al. ............. 710/104
2003/0200411 A1* 10/2003 Maeda et al. ............. 711/173
2004/0064619 A1* 4/2004 Liu et al. ............. 710/301
2006/0095660 A1* 5/2006 Ito et al. ............. 711/113

FOREIGN PATENT DOCUMENTS

| JP | 2000-222337 | 8/2000 |
| KR | 2003-0038576 | 5/2003 |
| KR | 2003-0081332 | 10/2003 |

OTHER PUBLICATIONS

English language abstract of Japanese Publication No. 2000-222337.
English language abstract of Korean Publication No. 2003-0038576.

* cited by examiner

*Primary Examiner*—Donald Sparks
*Assistant Examiner*—Fred W Detschel
(74) *Attorney, Agent, or Firm*—Marger Johnson & McCollom, P.C.

(57) ABSTRACT

A memory card is connected to a host using a NAND flash memory interface mode. In addition, the memory card further includes the NAND flash memory as well as a controller. The NAND flash memory uses an interface mode different from that supported by the host. The controller converts the interface mode of the host to the interface mode of the NAND flash memory. Thus a memory card can be made compatible with a host using another interface mode.

18 Claims, 5 Drawing Sheets

MEMORY CARD USING NAND FLASH MEMORY AND ITS OPERATING METHOD

This application claims priority from Korean Patent Application No. 2004-18967, filed on Mar. 19, 2004, the contents of which is herein incorporated by reference in its entirety.

FIELD OF THE INVENTION

This disclosure generally relates to memory cards and, more specifically, to a memory card embedding a NAND flash memory and a method for operating thereof.

BACKGROUND OF THE INVENTION

Most recently, recording media in appliances with auxiliary memory units of digital information, such as digital cameras, have advanced to memory cards (or IC cards), such as smart media cards, multimedia memory cards, and so forth. In years past, optical disks, magnetic disks (e.g., floppy disks and hard disks), computer disks (CD) and digital video disks (DVD) have been the state of the art. Recently, memory cards based on flash memories recently developed have been a center attraction due to their small size, convenience and fast transmission speed. A typical example is an extreme digital picture card (hereinafter inclusively referred to as "xD card"), which was developed as a memory card for a digital camera.

An xD card is a kind of memory card that uses NAND flash memories, and is also the next generation flash memory card in order to satisfy disadvantages of conventional smart media cards such as limitations of size and capacity.

An xD card is connected to a host (e.g., digital cameras) through a direct connection system. Accordingly, these xD cards, compared with conventional flash cards, secure digital (SD) cards, memory sticks, multimedia memory cards and so forth, have many advantages in the fact that they have a large data storage capacity with small size (25×20×1.7 (mm)), fast transmission speed, and small power consumption.

xD cards may be classified into a small xD card using a small capacity NAND flash memory having a 16 Kilo Byte (hereinafter inclusively referred to as "KB") block size and a large xD card using a large capacity NAND flash memory having a 128 KB block size. However, there is a problem in that the large and small capacity NAND flash memories, which are used as memories of xD cards, uses different interface modes, respectively.

Therefore, the large capacity xD card is not directly available to a host for supporting the small capacity xD card. Conversely, the small capacity xD card is not directly available to a host for supporting the large capacity xD card. These problems are not necessarily confined to xD cards, but are common problems in the field of memory cards based on flash memories.

SUMMARY OF THE INVENTION

Accordingly, the present invention is directed to a memory card compatible with a host using another interface mode.

In one aspect of the present invention, for the memory card connected to a host using a first-type NAND flash memory interface mode (hereinafter inclusively referred to as "a first interface mode"), the memory card comprises a NAND flash memory using a second-type NAND flash interface mode (hereinafter inclusively referred to as "a second interface mode") different from the first interface mode; and a controller for converting the first interface mode to the second interface mode.

In this embodiment, the first-type NAND flash memory is a small capacity NAND flash memory having a 16 KB block size, and the second-type NAND flash memory is a large capacity NAND flash memory having a 128 KB block size. In the contrary embodiment, the first-type NAND flash memory is a large capacity NAND flash memory, and the second-type NAND flash memory is a small capacity NAND flash memory.

In this embodiment, the controller receives an address and a command from the host, converts the address and the command to be used in the NAND flash memory and provides the converted address and command to the NAND flash memory. In addition, the controller transfers data from the host to the NAND flash memory or from the NAND flash memory to the host.

In this embodiment, the memory card is an extreme digital picture card (xD card).

In another aspect of the present invention, for a memory card connected to a host using a first interface mode, the memory card comprises a NAND flash memory using a second interface mode; and a controller for converting the first interface mode to the second interface mode. In this case, the controller comprises a first buffer for receiving a command and an address from the host; a command converting circuit for receiving a command from the first buffer to convert the command to be used in the NAND flash memory; an address converting circuit for receiving an address from the first buffer to convert the address to be used in the NAND flash memory; and a second buffer for transferring the converted command and address to the NAND flash memory.

In this embodiment, the controller further includes a buffer memory for storing data.

In this embodiment, the memory card is an extreme digital picture card (xD card).

In still another aspect of the present invention, a method for operating a memory card including a NAND flash memory card connected to a host using a first interface mode and using a second interface mode, the method comprises the steps of: a) receiving a command and an address from the host; b) converting the command and address to the second interface mode; and c) providing the converted command and address to the NAND flash memory.

In this embodiment, the operation method is an erase operation method. At this time, the erase operation method further comprises the steps of: d) shifting effective data from a first block to another second block when effective data is included in a first block to be erased; and e) erasing the first block.

In this embodiment, the memory card is an extreme digital picture card (xD card).

DETAILED DESCRIPTION OF THE PREFERRED EMBODIMENT

The present invention will be described more fully hereinafter with reference to the accompanying drawings in which exemplary embodiments of the invention are shown.

While the present invention has been described in connection with specific and preferred embodiments thereof, it is capable of various changes and modifications without departing from the spirit and scope of the present invention. It should be appreciated that the scope of the invention is not limited to the detailed description of the invention hereinabove, which is intended merely to be illustrative, but rather comprehends the subject matter defined by the following claims.

TABLE 1

|  | A small capacity NAND flash memory | A large capacity NAND flash memory |
| --- | --- | --- |
| Block size | 16 KB | 128 KB |
| Number of terminals (except power terminal) | 15 | 16 (add PRE) |
| Command | See Table 2 | See Table 3 |
| Write Unit (except spare) | 512 KB | 2 MB |
| Read Unit (except spare) | 512 KB | 2 MB |
| Erase Unit (except spare) | 16 KB | 128 KB |

Referring to Table 1, a block size of a small capacity memory is 16 KB. In addition, the small capacity memory has fifteen terminals (seven control signal terminals and eight output terminals) except for a power terminal. However, a large capacity memory having a 128 KB block size also has the fifteen terminals of the small capacity memory as well as a PRE (Power_on Read Enable) terminal. In this case, the PRE terminal controls an auto read operation.

The small capacity memory performs a read/write operation by a page unit of 512 Bytes (hereinafter inclusively referred to as "B") (except a spare region) and performs an erase operation by a block unit of 16 KB (except a spare region). Unlike this, the large capacity memory performs a read/write operation by a page unit of 2 MB (except a spare region) and an erase operation by a block unit of 128 KB (except a spare region).

In addition, an input mode of the large and small capacity memories is different. Commands mainly used in the small and large capacity memories are shown in Tables 2 and 3, respectively.

TABLE 2

| Function | 1st. Cycle | 2nd. Cycle | 3rd. Cycle |
| --- | --- | --- | --- |
| Read 1 | 00h/01h | — | — |
| Read 2 | 50h | — | — |
| Page Program | 80h | 10h | — |
| Copy-Back Program | 00h | 8Ah | 10h |
| Block Erase | 60h | D0h | — |

TABLE 3

| Function | 1st. Cycle | 2nd. Cycle |
| --- | --- | --- |
| Read | 00h | 30h |
| Page Program | 80h | 10h |
| Copy-Back Program | 85h | 10h |
| Block Erase | 60h | D0h |

Comparing Tables 2 and 3, the command input modes of the large capacity memory and the small capacity memory are different. While a command in the small capacity memory is inputted during the 1 st cycle through 3rd cycle, a command in the large capacity memory is inputted during the 1st through 2nd cycle. For example, in the read operation, '00h' or '01h' is inputted during the 1st cycle in the small capacity memory, and however, '00h' or '30h' is inputted during the 2nd cycle in the large capacity memory.

In addition, the command input values of the small capacity memory and the large capacity memory may be different. For instance, '01h' or '50h' is not used in the large capacity memory but in the small capacity memory. Furthermore, in the read operation, '01h', or '01h' or '50h' is used in the small capacity memory, but '00h' and '30h' are used in the large capacity memory.

As previously mentioned, due to differences of an interface mode, a memory card using the large capacity memory (hereinafter inclusively referred to as "a large capacity memory card") is not directly useable with a host using a small capacity memory (hereinafter inclusively referred to as "a small capacity memory card"). Conversely, the small capacity memory card is not directly useable with a host compatible with the large capacity memory card.

Figure 1:
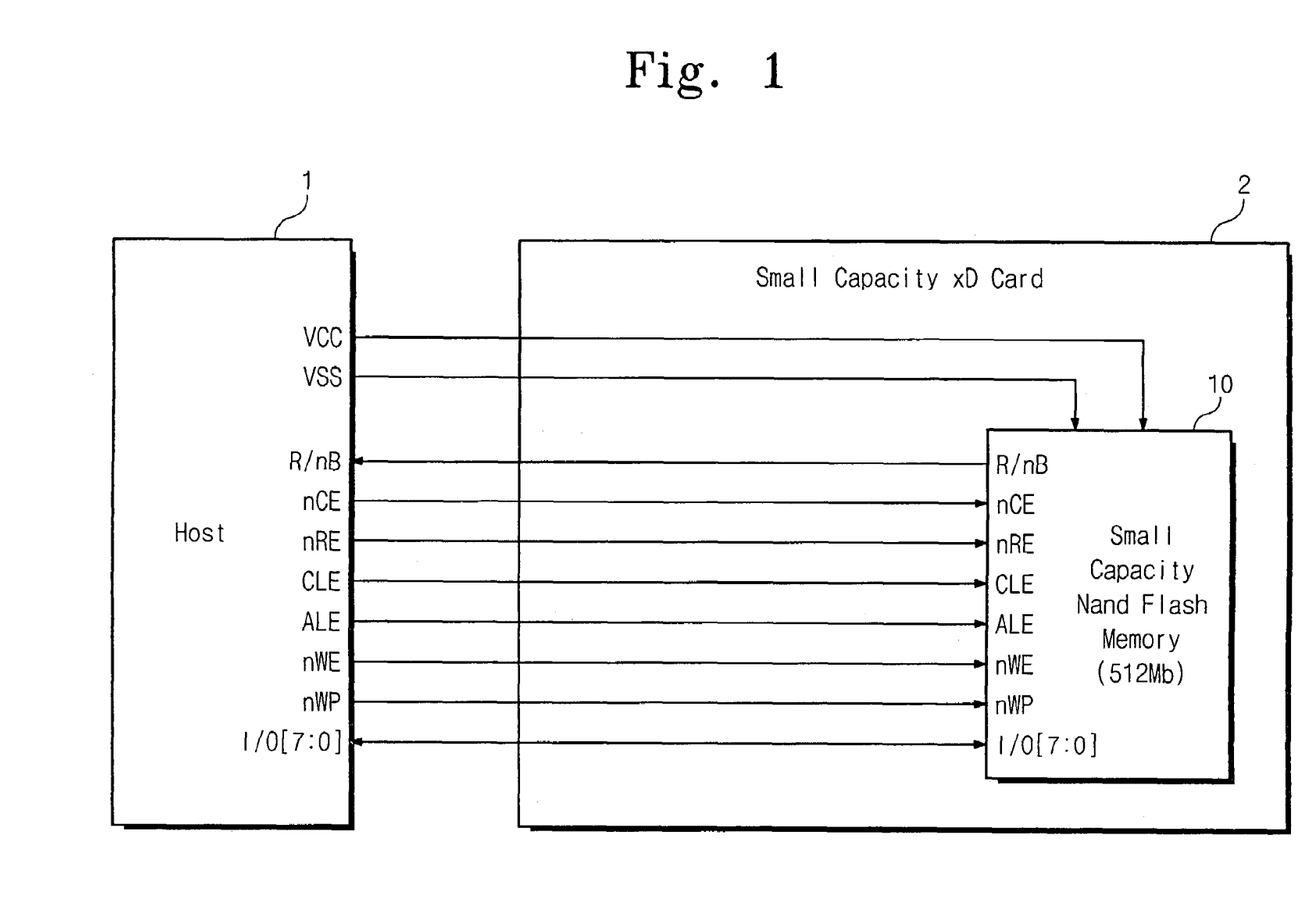
FIG. 1 is a block diagram showing an embodiment of a small capacity memory card.

FIG. 1 is a block diagram showing an embodiment of a small capacity memory card. In FIG. 1, the small capacity memory card is a small capacity xD card 2. The small capacity xD card 2 has a small capacity memory 10. The small capacity memory 10 has 512 Mb (Mega byte, hereinafter inclusively referred to as "Mb") memory capacity. The small capacity xD card 2 is directly connected to a host 1 and is directly accessed by the host 1. The reason for this is that the small capacity memory 10 uses the same NAND flash memory interface mode. The host 1 and the small capacity memory 10 have power terminals VCC and VSS, control signal terminal R/Nb, nCE, nRE, CLE, ALE, nWE and nWP, and an input/output terminal I/O[7:0]. The small capacity memory 10 receives a command, an address and data through the input/output terminal to perform a read/write/erase operation.

The block size and page size of the small capacity memory 10 are 16 KB and 512 KB, respectively. Accordingly, the small capacity xD card 2 performs the erase operation by 16 KB units and performs read and write operations by 512 KB units.

Figure 2:
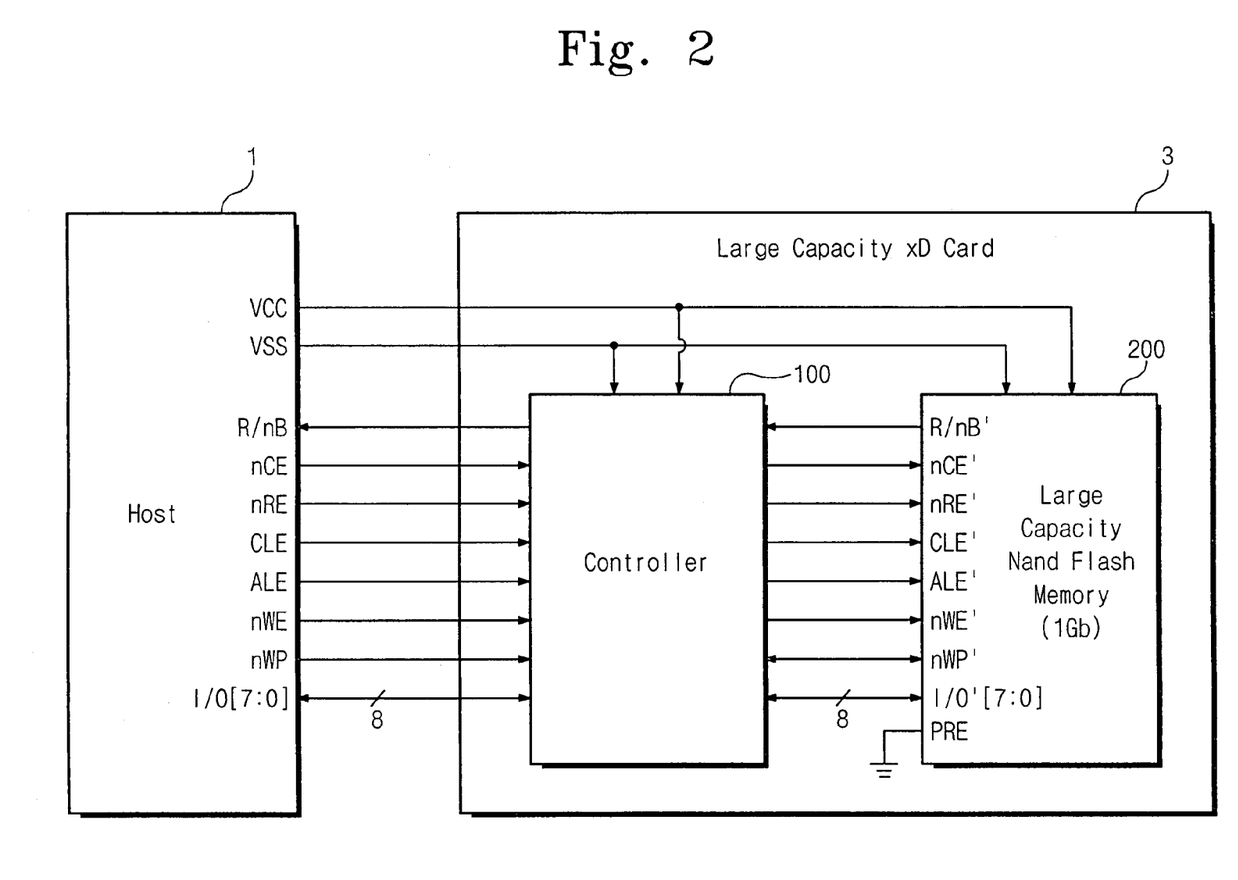
FIG. 2 is a block diagram showing a large capacity memory card according to an embodiment of the present invention.

FIG. 2 is a block diagram showing a large capacity memory card according to an embodiment of the present invention. In FIG. 2, the large capacity memory card is a large capacity xD card 3.

The large capacity xD card 3 has a large capacity memory 200. The large capacity memory 200 has 1 Gb (Gigabyte, hereinafter inclusively referred to as "Gb"). The large capacity memory 200 has power terminals VCC and VSS, control signal terminal R/Nb', nCE', nRE', CLE', ALE', nWE' and nWP', an input/output terminal I/O'[7:0], and a PRE terminal. The PRE terminal controls an auto read operation and is connected to a ground in FIG. 2.

The block size and page size of the large capacity memory 200 is 128 KB and 2 MB, respectively. In addition, the large capacity memory 200 performs an erase operation by a block unit (128 KB) and performs read/write operations by a page unit (2 MB).

Meanwhile, the host 1 is the same as that shown in FIG. 1 and is compatible with the small capacity memory card 2. The interface mode of the host 1 is equal to that of the small capacity memory 10 (see FIG. 1), but is not equal to that of the large capacity memory 200. Therefore, it is impossible for the large capacity memory 200 to be used by directly connecting to the host 1.

To solve the problem of inconsistency between the interface modes of the host 1 and the large capacity memory 200, the large capacity xD card 3 further includes a controller 100. The controller 100 converts the interface mode of the host 1 into the interface mode of the large capacity memory 200. For example, the controller 100 receives an address and a command from the host 1 and then converts the address and command and provides the converted address and command to the large capacity memory 200 to be usable in the large capacity memory 200.

Figure 3:
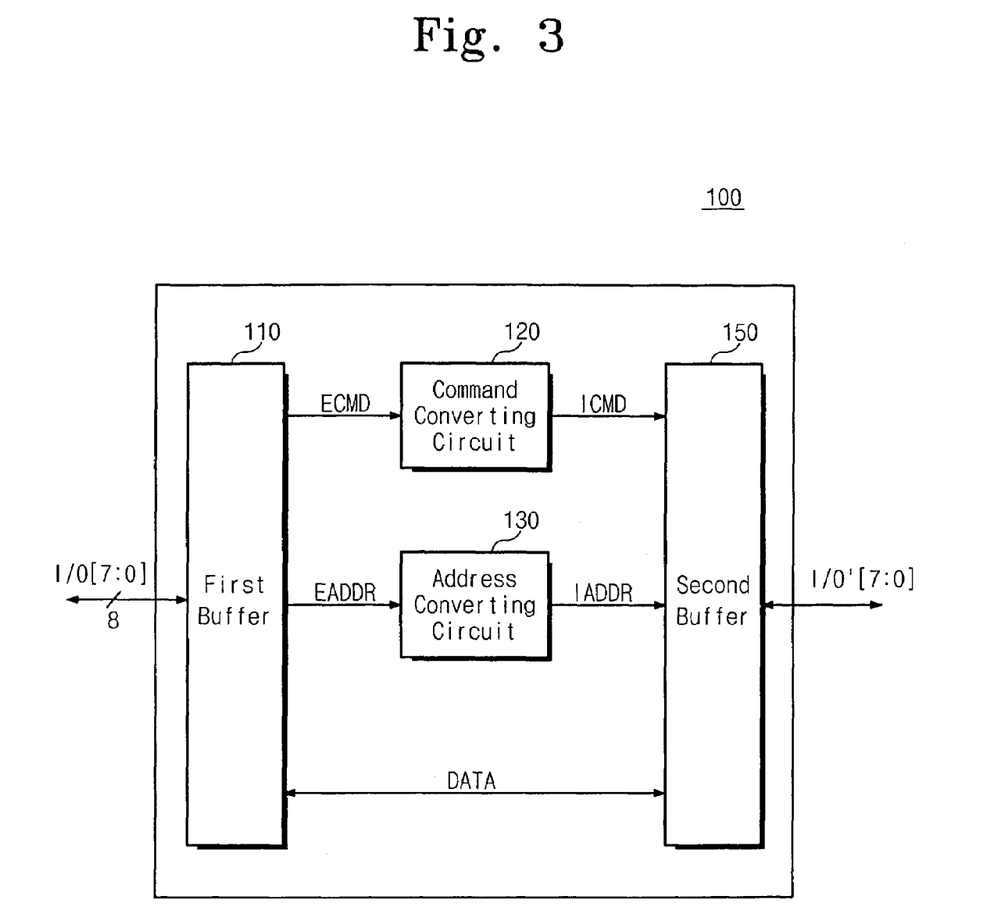
FIG. 3 schematically shows a first embodiment of a controller shown in FIG. 2.

FIG. 3 schematically shows a first embodiment of the controller shown in FIG. 2. Referring to FIG. 3, the controller 100 includes a first buffer 110, a command converting circuit 120, an address converting circuit 130 and a second buffer 150.

The first buffer 110 is connected to an input/output terminal (I/O) of the host (see FIG. 2). In addition, the first buffer 110 receives data by Byte units to generate a command ECMD, an address EADDR, and data DATA.

The command converting circuit 120 receives the command ECMD from the first buffer 110 and then converts a command ICMD to be usable in the large capacity memory 200 (see FIG. 2). Since the large capacity memory 200 uses different command input mode or different command input value with respect to a read/write/erase operation, the command converting circuit 120 is necessary. In addition, the command converting circuit 120 receives a command ECMD from the host 1 to convert the command ICMD suitable for the interface mode of the large capacity memory 200. The reason for this is to solve a problem caused by using different commands of the host 1 and the large capacity memory 200.

For instance (see Tables 2 and 3), when the '00h" command for instructing a read operation is received from the host 1, the command converting circuit 120 converts the '00h' command into '00h' and '30h' commands. Even if the '01h' or '50h' command not used in the large capacity memory 200 is inputted, the command converting circuit 120 converts the '01h' or '50h' command into '01h' and '30h' commands.

The address converting circuit 130 receives an address EADDR from the first buffer 110 to convert an address IADDR usable in the large capacity memory 200. The address converting circuit 130 is operated referring to an address mapping table (not shown). The address converting circuit 130 converts the address from the host 1 into an address usable in the large capacity memory 200 employing the address mapping table.

The address converting circuit 130 can solve a problem due to different fundamental units of read/write operations between the host 1 and the large capacity memory 200. A page size being a fundamental unit of write/read operations supplied from the host 1 is 512 KB. A page size being a fundamental unit of write/read operation supplied from the large capacity memory is 2 MB. The page of the large capacity memory 200 may be divided into four small units by 512 KB. Accordingly, one size of the large capacity memory 200 is equal to four pages supplied from the host 1.

In read/write operations, the address converting circuit 130 receives a source address from the host 1. The source address is suitable to the small capacity memory 10 (see FIG. 1) managed by a 512 KB unit and is not used in the large capacity memory 200. The address converting circuit 130 interprets the source address employing the address mapping table and then converts it into a target address usable in the large capacity memory 200.

The second buffer 150 receives the command ICMD generated from the command converting circuit 120 and the address IADDR generated from the address converting circuit 130 to output through an input/output terminal (I/O') to the large capacity memory 200 by Byte unit.

The controller 100 transfers data applied from the host 1 (see FIG. 2) to the large capacity memory 200 (see FIG. 2). In addition, the controller 100 transfers data outputted from the large capacity memory 200 to the host 1.

Figure 4:
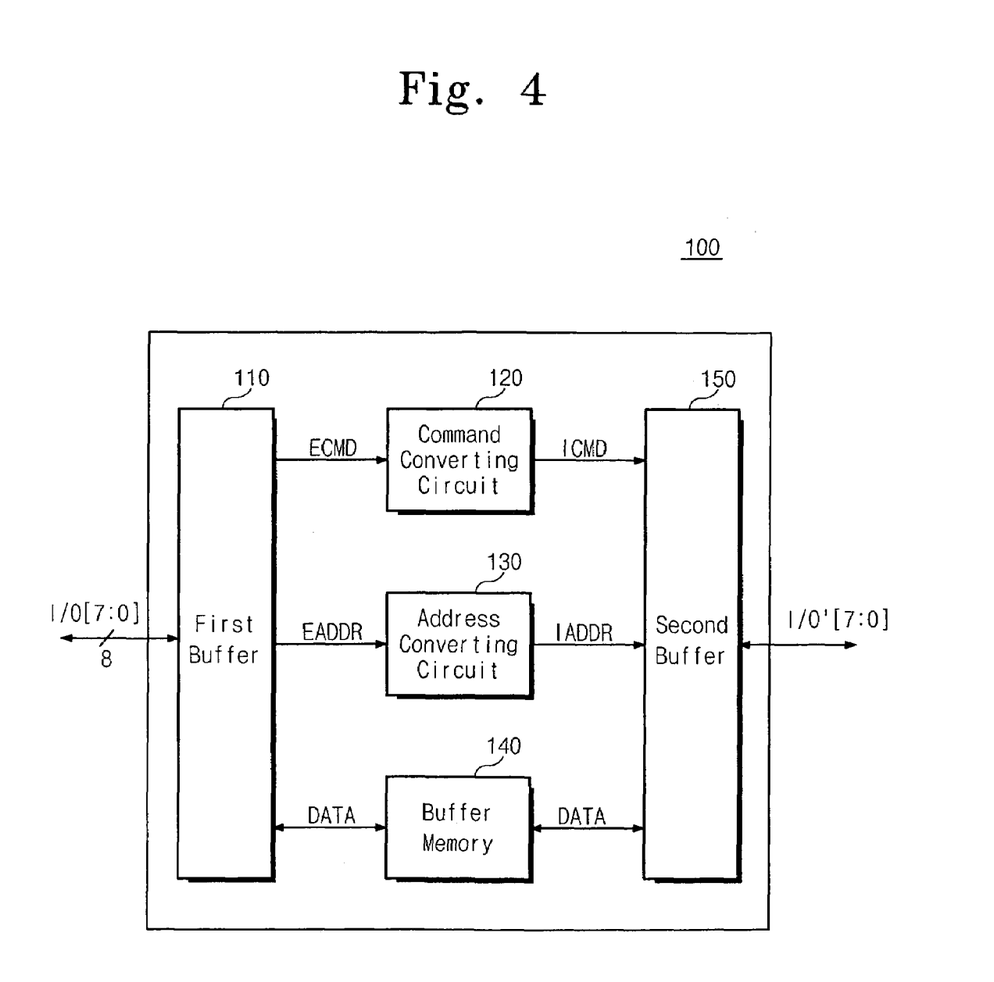
FIG. 4 schematically shows a second embodiment of the controller shown in FIG. 2.

FIG. 4 schematically shows the second embodiment of the controller shown in FIG. 2. The reference numbers that are the same as those in FIG. 3 indicate the same members for performing the same functions. However, as shown in FIG. 4, the controller 100 further includes a buffer memory 140. The buffer memory 140 temporarily stores the data applied from the host 1 and then transfers them to the large capacity memory 200. Also, the buffer memory 140 temporarily stores data outputted from the large capacity memory 200 and then transfers them to the host 1.

Figure 5:
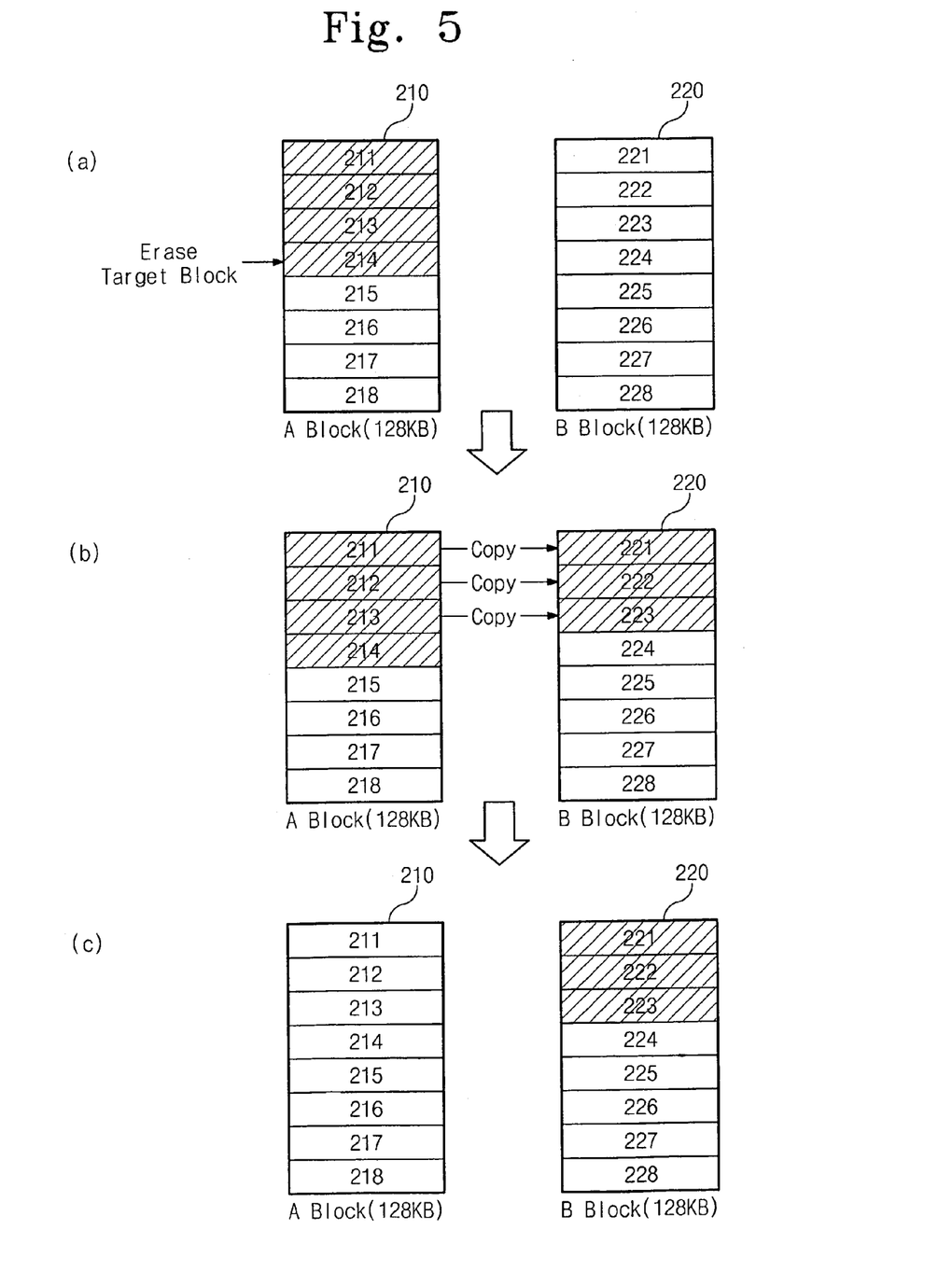
FIG. 5 is a conception diagram showing an erase operation in the large capacity memory card.

FIG. 5 is a conception diagram showing an erase operation of the large capacity memory card shown in FIG. 2. The large capacity memory 200 (see FIG. 2) performs an erase operation by 128 KB units. The host 1 supports the erase operation by 16 KB units. FIG. 5 shows a process for solving a problem caused by different fundamental units of the erase operation between the host 1 and the large capacity memory 200.

When a command and an address for instructing the erase operation from the host 1 is inputted, the controller 100 (see FIG. 2) interprets the command and address to determine a target block to be erased. The size of the target block is 16 KB. However, the size of the block to be practically erased is 128 KB in the large capacity memory 200.

FIG. 5(a) is a conception diagram showing an initial state of the blocks in an erase operation. An A block 210 and a B block 220 are any blocks included in the large capacity memory 200 and have 128 KB block size, respectively. The erase operation is practically performed in the A block of the large capacity memory 200 and may be classified into eight small blocks 211 to 218 having 16 KB block size. The target block to be erased among the small blocks 211 to 218 is the small block 214 and is obtained by interpreting the address inputted from the host 1. Effective data is stored in the small blocks 211 to 213. Therefore, it is necessary for the effective data stored in the small blocks 211 to 213 to be transferred to the B block 220 before performing the erase operation.

FIG. 5(b) is a conception diagram showing that the effective data in the A block is transferred to the B block. By a copy-back operation, effective data of the small blocks 211 to 213 in the A block 210 is transferred to the small blocks 221 to 223 in the B block 220. At this time, the controller 100 designates addresses of the small blocks 211 to 213 and the small blocks 221 to 223 through the address mapping operation.

FIG. 5(c) is a conception diagram showing an erase operation with respect to the A block. If the copy-back operation is completed, the entire A block 210 including a target block 214 to be erased is erased. As a result, the A block 210 is erased, but effective data is preserved in the B block 220.

According to the above-mentioned processes, it is possible to prevent a loss of the effective data due to different block sizes between the host 1 and the large capacity memory 200.

While the embodiment has been described for the case that the large capacity memory card is connected to the host for supporting the small capacity memory card, it will be understood by those skilled in the art that the small capacity memory card is connected to the host for supporting the large capacity memory card.

According to the present invention, the large capacity memory card can be directly used in the host for supporting the small capacity memory card. Furthermore, the small capacity memory card can be directly used in the host for supporting the large memory card.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A memory card connected to a host using a first interface mode in which the host commands NAND flash memories based on a first set of predetermined commands, including commands that are applied across at least two timing cycles, and addresses NAND flash memories based on first page and block sizes, the memory card comprising:
   a NAND flash memory using a second interface mode in which the NAND flash memory responds to commands based on a second set of predetermined commands, including commands that are applied across timing cycles different from the first set, and the NAND flash memory responds to addresses based on second page and block sizes different from the first page and block sizes; and
   a controller to convert the first interface mode to the second interface mode, the controller including:
   a command converting circuit to receive a command from such a host and convert the command to be used in the NAND flash memory, the command converting circuit being constructed and arranged to convert a command from the first set into a command from the second set; and
   an address converting circuit to receive the address from such a host and convert the address to be used in the NAND flash memory, the address converting circuit comprising a lookup table that maps the received address to the converted address.

2. The memory card of claim 1, wherein a block size of the interface mode is 128 KB.

3. The memory card of claim 2, wherein the first interface mode inputs or outputs data by a Byte unit.

4. The memory card of claim 1, wherein a block size of the second interface mode is 128 KB.

5. The memory card of claim 4, wherein the second interface mode inputs or outputs data by a Byte unit.

6. The memory card of claim 1, wherein a block size of the first interface mode is 16 KB.

7. The memory card of claim 6, wherein the first interface mode inputs or outputs data by a Byte unit.

8. The memory card of claim 1, wherein a block size of the second interface mode is 16 KB.

9. The memory card of claim 8, wherein the second interface mode inputs or outputs data by a Byte unit.

10. The memory card of claim 1, wherein the controller receives an address and a command from the host, converts the address and the command to be used in the NAND flash memory and provides the converted address and the converted command to the NAND flash memory.

11. The memory card of claim 10, wherein the controller transfers data from the host to the NAND flash memory or from the NAND flash memory to the host.

12. The memory card of claim 1, wherein the memory card is an extreme digital picture card (xD card).

13. The memory card of claim 1, wherein a size of the memory card is (20×25×1.7) mm.

14. A memory card connected to a host using a first interface mode in which the host commands NAND flash memories based on a first set of predetermined commands, including commands that are applied across at least two timing cycles, and addresses NAND flash memories based on first page and block sizes, the memory card comprising:
   a NAND flash memory using a second interface mode in which the NAND flash memory responds to commands based on a second set of predetermined commands, including commands that are applied across timing cycles different from the first set, and the NAND flash memory responds to addresses based on second page and block sizes different from the first page and block sizes;
   a controller to convert the first interface mode to the second interface mode, wherein the controller includes:
   a first buffer to receive a host command and an address from the host,
   a command converting circuit to receive a command from the first buffer and convert the command to be used in the NAND flash memory, the command converting circuit being constructed and arranged to convert a command from the first set into a command from the second set,
   an address converting circuit to receive the address from the first buffer and convert the address to be used in the NAND flash memory, the address converting circuit comprising a lookup table that maps the received address to the converted address, and
   a second buffer to transfer the converted command and converted address to the NAND flash memory.

15. The memory card of claim 14, wherein the controller further includes a buffer memory to store data.

16. The memory card of claim 14, wherein the memory card is an extreme digital picture card (xD card).

17. A method of operating a memory card including a NAND flash memory connected to a host using a first interface mode in which the host commands NAND flash memories based on a first set of predetermined commands, including commands that are applied across at least two timing cycles, and addresses NAND flash memories based on first page and block sizes, the method comprising:
   receiving from the host a command from the first set of predetermined commands;
   converting the received command to a command from a second set of predetermined commands, including commands that are applied across timing cycles different from the first set;
   receiving from the host an address based on second page and block sizes different from the first page and block sizes;

mapping the received address to an address based on second page and block sizes different from the first page and block sizes; and providing the converted command and converted address to the NAND flash memory.

18. The method of claim 17, wherein the memory card is an extreme digital picture card (xD card).

* * * * *

UNITED STATES PATENT AND TRADEMARK OFFICE
CERTIFICATE OF CORRECTION

PATENT NO. : 7,356,646 B2 Page 1 of 1
APPLICATION NO. : 11/025731
DATED : April 8, 2008
INVENTOR(S) : Kyong-Ae Kim It is certified that error appears in the above-identified patent and that said Letters Patent is hereby corrected as shown below:

Column 7, line 57, the words "the interface" should read -- the first interface --.

Signed and Sealed this

Fourteenth Day of October, 2008

JON W. DUDAS
*Director of the United States Patent and Trademark Office*